US011527150B2

(12) United States Patent
Elhadeedy

(10) Patent No.: US 11,527,150 B2
(45) Date of Patent: Dec. 13, 2022

(54) VEHICLE REMOTE CONTROL

(71) Applicant: Ford Global Technologies, LLC, Dearborn, MI (US)

(72) Inventor: Ahmed Elhadeedy, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 16/406,625

(22) Filed: May 8, 2019

(65) Prior Publication Data

US 2020/0357269 A1 Nov. 12, 2020

(51) Int. Cl.
*G08C 17/00* (2006.01)
*G08C 17/02* (2006.01)
*G05D 1/00* (2006.01)
*H04W 4/40* (2018.01)
*H04W 4/021* (2018.01)
*H04W 4/20* (2018.01)
*H04L 67/12* (2022.01)
*G07C 9/28* (2020.01)

(52) U.S. Cl.
CPC ........... *G08C 17/02* (2013.01); *G05D 1/0022* (2013.01); *G07C 9/28* (2020.01); *H04L 67/12* (2013.01); *H04W 4/021* (2013.01); *H04W 4/20* (2013.01); *H04W 4/40* (2018.02); *G08C 2201/93* (2013.01)

(58) Field of Classification Search
CPC ..... G08C 17/02; G08C 2201/93; H04W 4/40; H04W 4/021; H04W 4/20; G07C 9/28; G05D 1/0022; H04L 67/12
See application file for complete search history.

(56) References Cited

U.S. PATENT DOCUMENTS

| 9,198,117 | B2 * | 11/2015 | Raleigh | H04W 48/14 |
| 9,277,489 | B2 * | 3/2016 | Reif | H04W 48/16 |
| 9,632,506 | B2 * | 4/2017 | Wellman | G05D 1/0282 |
| | | | | 705/7 |
| 9,725,069 | B2 | 8/2017 | Krishnan | |
| 9,961,710 | B2 * | 5/2018 | Son | H04W 76/028 |
| | | | | 370/338 |
| 9,980,304 | B2 * | 5/2018 | Huang | H04W 76/023 |
| 2011/0060480 | A1 | 3/2011 | Mottla et al. | |
| 2014/0274013 | A1 * | 9/2014 | Santavicca | H04W 4/008 |
| | | | | 455/418 |

(Continued)

FOREIGN PATENT DOCUMENTS

CN 109720297 A * 5/2019 ............. B60R 25/20

OTHER PUBLICATIONS

H. Mansor, K. Markantonakis, R. N. Akram, K. Mayes and I. Gurulian, "Log Your Car: The Non-invasive Vehicle Forensics," 2016 IEEE Trustcom/BigDataSE/ISPA, 2016, pp. 974-982, doi: 10.1109/TrustCom.2016.0164. (Year: 2016).*

*Primary Examiner* — Elaine Gort
*Assistant Examiner* — Brittany Renee Peko
(74) *Attorney, Agent, or Firm* — Michael Spenner; Brooks Kushman P.C.

(57) ABSTRACT

A vehicle includes a controller, programmed to responsive to receiving a credential for connecting to a wireless network from a mobile device, connect to the wireless network using the credential; and establish a link with the mobile device via the wireless network, wherein the credential is received through a cloud server via a wireless connection other than the wireless network.

15 Claims, 4 Drawing Sheets

(56) References Cited

U.S. PATENT DOCUMENTS

| | | | |
|---|---|---|---|
| 2014/0309789 A1* | 10/2014 | Ricci | G05D 23/1917 |
| | | | 700/276 |
| 2018/0191829 A1 | 7/2018 | Morales | |
| 2018/0374126 A1* | 12/2018 | Patil | G06Q 30/02 |
| | | | 705/14 |
| 2020/0178050 A1* | 6/2020 | DeLuca | H04W 4/48 |
| | | | 455/418 |
| 2020/0242855 A1* | 7/2020 | Sandu | G07C 5/008 |
| | | | 701/36 |
| 2021/0010315 A1* | 1/2021 | Honjo | E05F 15/73 |
| | | | 340/5 |

* cited by examiner

VEHICLE REMOTE CONTROL

TECHNICAL FIELD

The present disclosure generally relates to vehicle remote controls. More specifically, the present disclosure relates to vehicle remote controls using Wi-Fi.

BACKGROUND

Many vehicles are provided with remote control features. A user may command a vehicle to perform predefined functions (e.g. start engine, lock/unlock doors) via a digital device such as a smart phone. The digital device may generate a command and send the command to a cloud server associated with the vehicle. The vehicle may receive the command from the cloud server via an onboard modem (usually through a cellular network). Due to the complexity of the command transaction and signal reception of the onboard modem, the whole process from the user sending the command to the vehicle receiving the command may take a long time, negatively affecting user experience.

SUMMARY

In one or more illustrative embodiments of the present disclosure, a vehicle includes a controller, programmed to responsive to receiving a credential for connecting to a wireless network from a mobile device, connect to the wireless network using the credential; and establish a link with the mobile device via the wireless network, wherein the credential is received through a cloud server via a wireless connection other than the wireless network.

In one or more illustrative embodiments of the present disclosure, a vehicle includes a controller, programmed to responsive to receiving a credential for connecting to a wireless hotspot of a mobile device, connect to the wireless hotspot using the credential and establish a hotspot connection; and responsive to receiving a command from the mobile device via the hotspot connection, execute the command to perform a predefined function, wherein the credential is received through a cloud server via a wireless connection other than the hotspot connection.

In one or more illustrative embodiments of the present disclosure, a mobile device includes a controller, programmed to responsive to receiving a user input, enable a wireless hotspot and generate a credential for the wireless hotspot; send the credential to a vehicle associated with the mobile device via a wireless connection through a cloud server; and responsive to detecting the vehicle connects to the wireless hotspot, transmit a vehicle command to the vehicle via the hotspot.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a remote control system for a vehicle. More specifically, the present disclosure proposes a vehicle remote control system using Wi-Fi technology.

Figure 1:
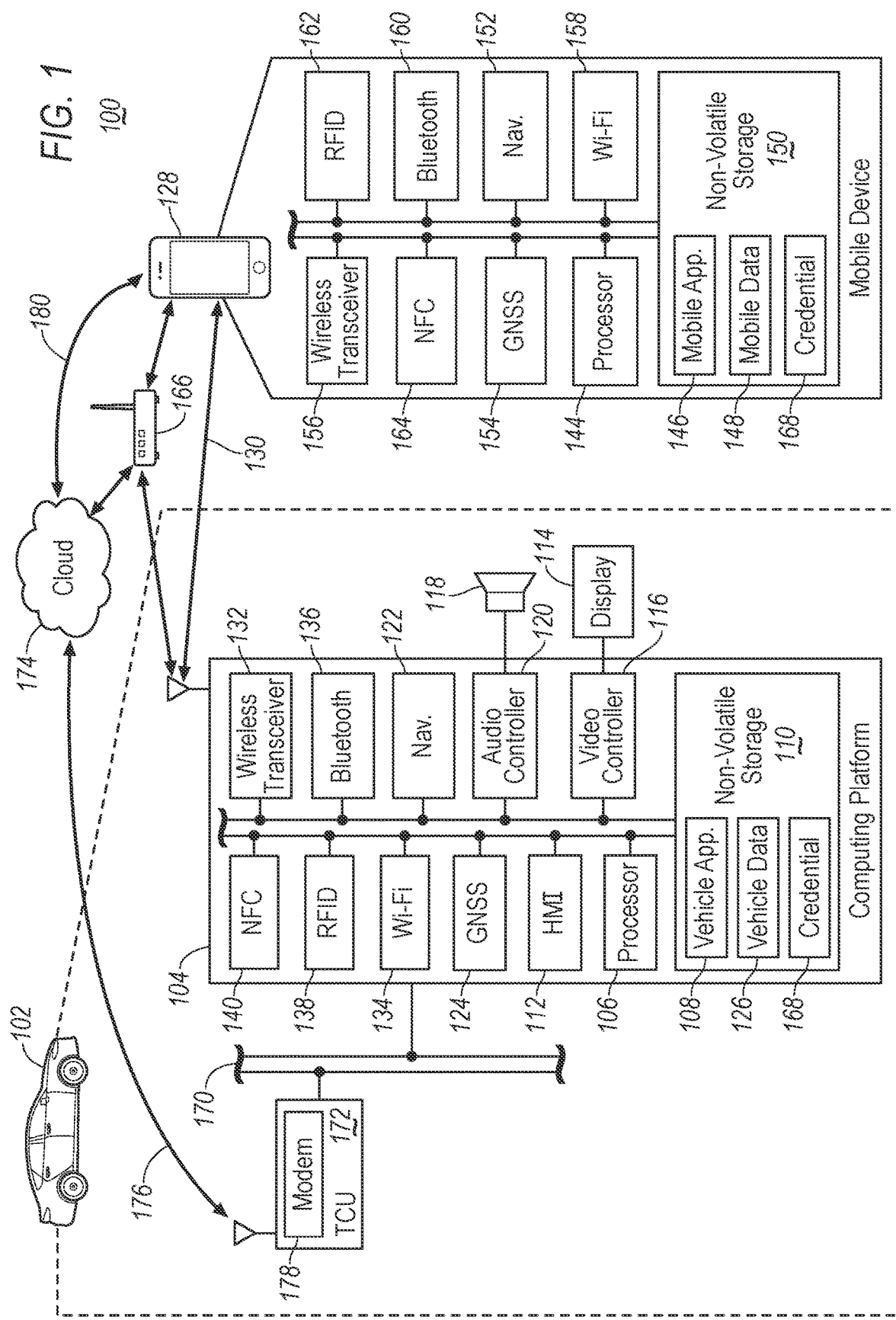
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, remote controls, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 156 of the mobile device 128.

The mobile device 128 may be provided with a processor 144 configured to perform instructions, commands, and other routines in support of the processes such as navigation, telephone, wireless communication, and multi-media processing. Mobile applications 146 and mobile data 148 may be stored in a non-volatile storage 150. The mobile device 128 may be provided with location and navigation functions via a navigation controller 152 and a GNSS controller 154. The mobile device 128 may be provided with a wireless transceiver 156 in communication with a Wi-Fi controller 158, a Bluetooth controller 160, a RFID controller 162, an NFC controller 164, and other controllers (not shown), configured to communicate with the wireless transceiver 132 of the computing platform 104. Additionally or alternatively, the mobile device 128 may be configured to communicate with the computing platform 104 via a wireless router 166. The wireless router 166 may be a Wi-Fi router as an example to facilitate a transmission control protocol/Internet protocol (TCP/IP) communication between the computing platform 104 and the mobile device 128. The router 166 may be configured to be provide a secured connection and only allows to connect with a credential (e.g. a password). The computing platform 104 and the mobile device 128 may be provided with the credential 168 to connect to the wireless router 166. The credential 168 may be stored on the storage 110 and 150 respectively.

The computing platform 104 may be further configured to communicate with various components of the vehicle 102 via one or more in-vehicle network 170. The in-vehicle network 170 may include, but is not limited to, one or more of a controller area network (CAN), an Ethernet network, and a media-oriented system transport (MOST), as some examples.

The computing platform 104 may be configured to communicate with a TCU 172 configured to control telecommunication between vehicle 102 and a cloud 174 through a wireless connection 176 using a modem 178. The wireless connection 176 may be in the form of various communication network e.g. a cellular network. The term cloud is used as a general term in the present disclosure and may include any computing network involving computers, servers, controllers or the like configured to perform data processing functions and facilitate communication between various entities. The mobile device 128 may be configured to connect to the cloud 174 via a wireless connection 180. Alternatively, the computing platform 104 and the mobile device 128 may be configured to access the cloud 174 via the wireless router 166.

Figure 2:
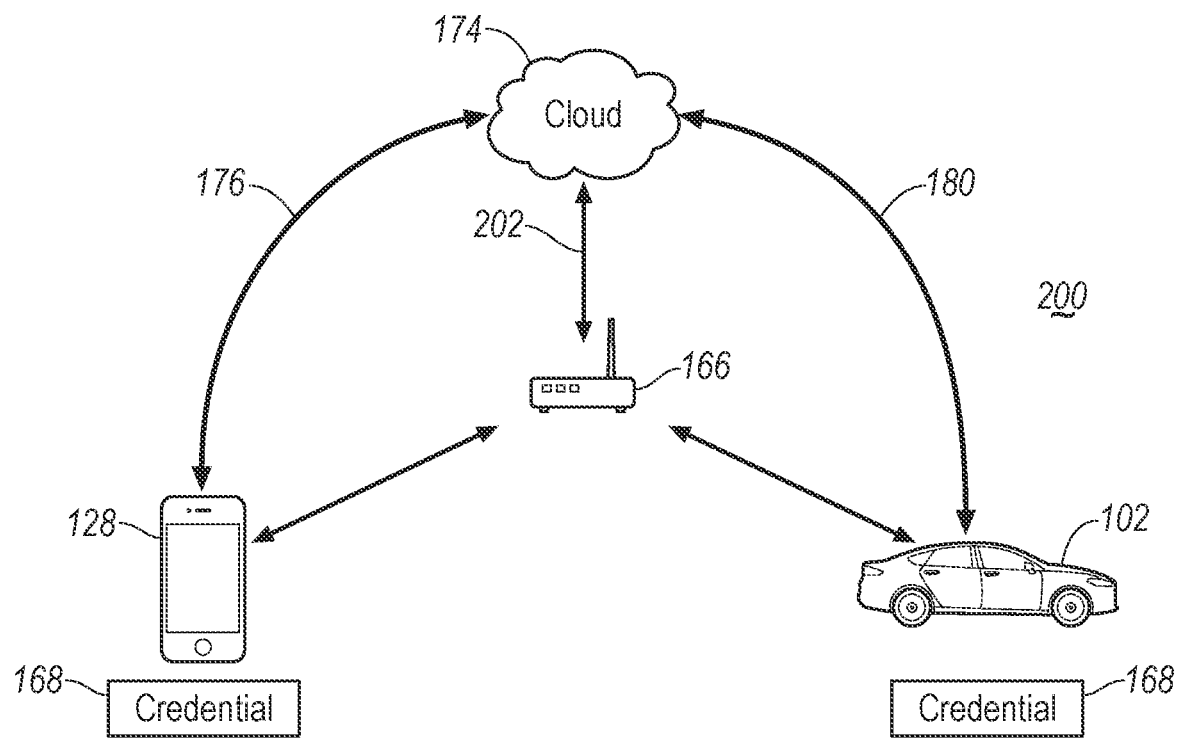
FIG. 2 illustrates an example schematic diagram of one embodiment of the present disclosure.

As illustrated in FIG. 2, a schematic diagram 200 of one embodiment of the present disclosure is illustrated. With continuing reference to FIG. 1, in the present example, the mobile device 128 has already been pair with the vehicle 102, and the mobile device 128 may be configured to communicate with the vehicle 102 via the cloud 174 using the mobile application 146. To send a command (e.g. start engine) to the vehicle 102, the mobile device 128 may be configured to send the command to the cloud 174 via the wireless connection 176. Responsive to receiving the command, the cloud server 174 may identify the destination vehicle 102 and forward the command to the vehicle 102 via the wireless connection 180. The vehicle 102 may execute the command (e.g. to start the engine) via the vehicle application 108 responsive to receiving the command from the cloud 174 via the wireless connection 180 through the TCU 172.

Alternatively, at least one of the mobile device 128 or the vehicle 102 may be connected to the cloud via the wireless router 166. For instance, the mobile device 128 may be connected to the cloud 174 via the wireless router 166 using the credential 168. The credential 168 may be input into the mobile device 128 via an interface (not shown) by the user. Since the mobile device 128 has already been paired with the vehicle 102, the mobile application 146 may be configured to send the credential 168 to the vehicle 102 via the cloud 174. Responsive to receiving the credential 168 from the cloud 174, the vehicle application 108 of the vehicle 102 may connect to the wireless router 166 using the credential 168 when the vehicle 102 is within the transmission range of the router 166. In this way, the mobile device 128 and/or the vehicle 102 may connect to the cloud 174 via the router 166, in addition to or in lieu of the individual wireless connections 176 and 189 respectively. For instance, in case that both the mobile device 128 and the vehicle 102 are connected to the wireless router 166, a command generated by the mobile device 128 may be transmitted to the cloud 174 via the router 166 through a connection 202. The connection 202 may be an Internet connection for instance. The cloud server 174 may then transmit the command to the vehicle 102 using the connection 202 via the router 166. It is noted that the term router is used as a general term in the present disclosure and may include one or more routing devices associated with a wireless network. For instance, in the Wi-Fi context, the router may refer to a Wi-Fi network having multiple access points operated by multiple routing devices.

The operations of the embodiment illustrated with reference to FIG. 2 may be applied to various situations. For instance, the wireless router 166 may include a home or office Wi-Fi network configured to provide Internet access to a user at home or in the office. The vehicle 102 operated by the user may be parked within the transmission range of the wireless router 166. Similarly, the mobile device 128 may be connected to the router 166. Since the connection 202 from the router 166 to the cloud 174 may be a wired connection, the router 166 may provide a faster and more reliable connection to the cloud 174 compared with the wireless connections 176 and 180 utilizing cellular network for instance. In this way, commands from the mobile device 128 may be transmitted to the vehicle 102 faster and more reliably.

As an alternatively example as illustrated with reference to FIG. 2, once both the mobile device 128 and the vehicle 102 are connected to the router 166, a direct connection (e.g. a TCP/IP connection) between the mobile application 146 and the vehicle application 108 may be established via the router 166 without going through the cloud 174. In this embodiment, the connection 202 between the router 166 and the cloud 174 is not necessary. The mobile device 128 may be configured to send a command to the vehicle 102 directly using the direct connection enabled by the wireless router 166.

Figure 3:
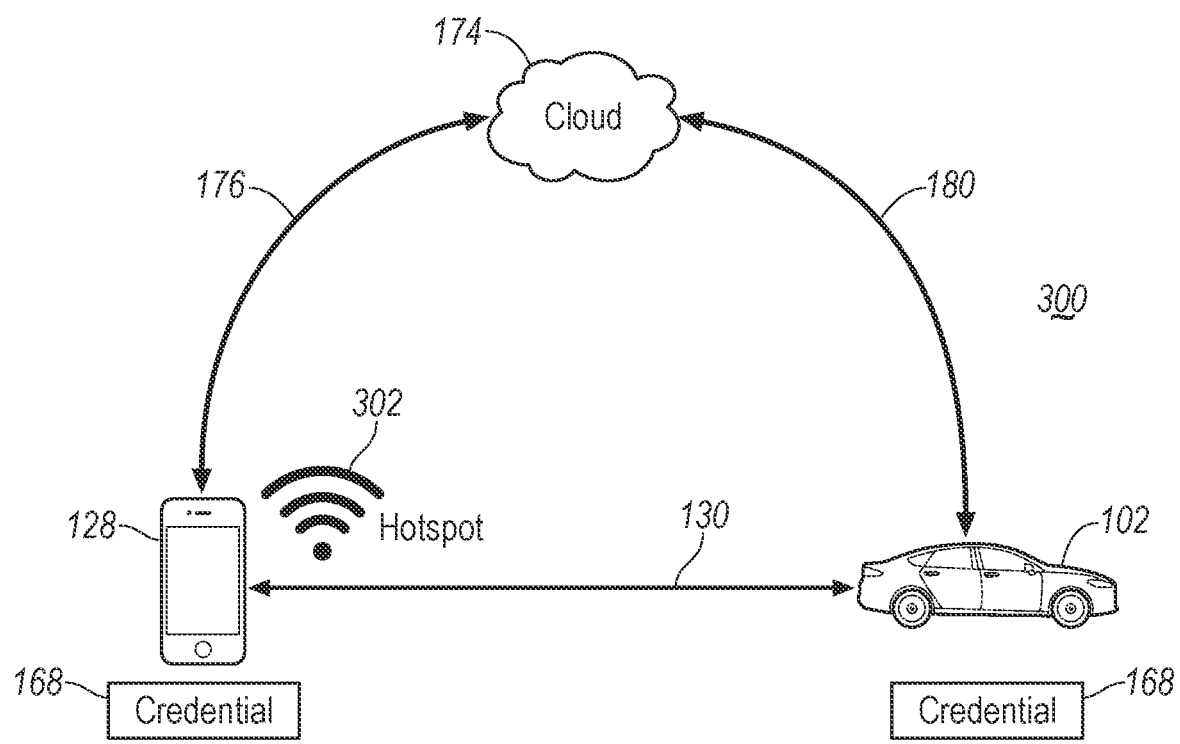
FIG. 3 illustrates an example schematic diagram of another embodiment of the present disclosure.

Referring to FIG. 3, a schematic diagram of another embodiment of the present disclosure is illustrated. Compared to the examples illustrated with reference to FIG. 2, in the present example, the wireless router 166 is not used. The mobile application 146 may be configured to enable a wireless hotspot 302 feature at the mobile device 128. For instance, the wireless hotspot 302 may be a Wi-Fi hotspot. The mobile application 146 may be configured to generate a credential to authorize the vehicle 102 to connect to the wireless hotspot 302 of the mobile device 128. Alternatively, the mobile application 146 may be configured to allow a user to manually input a connection credential if the user prefers. The mobile device 128 may then send the credential 168 to the vehicle 102 via the cloud 174. Responsive to receiving the credential 168 from the cloud 174, the vehicle 102 may connect the hotspot 302 from the mobile device 128 using the credential when the vehicle 102 is within the transmission range of the hotspot 302. For security reasons, the mobile application 146 may be further configured to regenerate a new credential 168 for the hotspot periodically. The new credential may be sent to the vehicle 102 in the same way via the cloud 174.

Once connected to the wireless hotspot 302, the vehicle 102 may communicate with the mobile device in various ways. In one example, the vehicle 102 may use the wireless hotspot 302 to connect to the cloud 174 and communicate with the mobile device via the cloud 174. To send a command to the vehicle 102, the mobile device 102 may first send the command to the cloud 174 via the wireless connection 176. The cloud 174 may then transmit the command to the vehicle 102 via the wireless connection 176 and the hotspot connection 130. In an alternative example, once the vehicle 102 is connected to the wireless hotspot 302, the mobile device 128 may be configured to directly communicate with the vehicle 102 via the hotspot connection 130 without the involvement of the cloud 174. A command from the mobile device 128 may be sent to the vehicle 102 directly using the hotspot connection 130. As an alternative example, the hotspot feature discussed in the above examples may be implemented in a reversed manner. The vehicle application 108 may be configured to enable a hotspot on the vehicle 102 and the mobile device 128 may be configured to connect to the hotspot of the vehicle 102 to perform substantially the same functions. In this example, the credential 168 may be generated by the computing platform 104 of the vehicle 102 and sent to the mobile device 128 via the cloud 174.

Figure 4:
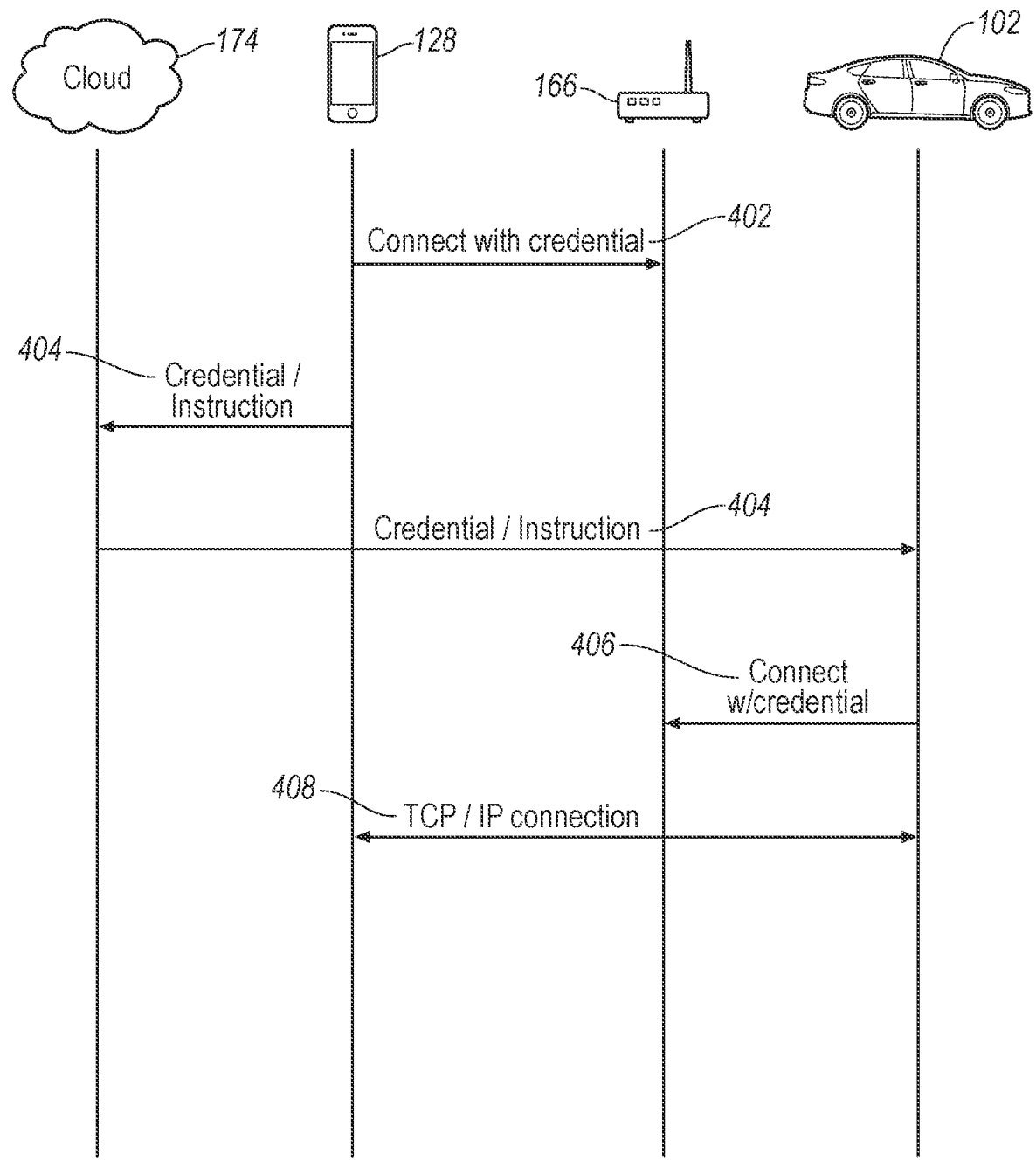
FIG. 4 illustrates an example data flow diagram of one embodiment of the present disclosure.

Referring to FIG. 4, a data flow diagram 400 for a process of one embodiment of the present disclosure is illustrated. At operation 402, the mobile device 128 connects to the wireless router 166 using the credential 168. The credential 168 may be manually input into the mobile device 128 via the mobile application 146. Responsive to a successful connection to the router 166, at operation 404, the mobile device 128 sends the credential 168 along with connection instructions to the vehicle 102 via the cloud 174. The connection instructions may include an identity of the router/network, an identity of the mobile device 128, instructions to establish a TCP/IP connection or the like. The vehicle 102 has previously been paired with the mobile device 128 and the cloud 174 may identify the vehicle 102 as associated with the mobile device 128. The credential 168 and instructions may be sent out via the router 166, as illustrated with reference to FIG. 4. Alternatively, the mobile device 128 may be configured to send the credential 168 and instructions directly to the cloud via wireless connection 176 without using the router 166.

Responsive to receiving the credential and instructions from the cloud 174, at operation 406, the vehicle 102 connects to the router 166 using the instructions and credential 168. Since both the mobile device 128 and the vehicle 102 are connected to the same wireless network 166, a TCP/IP connection may be established between the mobile device 128 and the vehicle 102 at operation 408.

Figure 5:
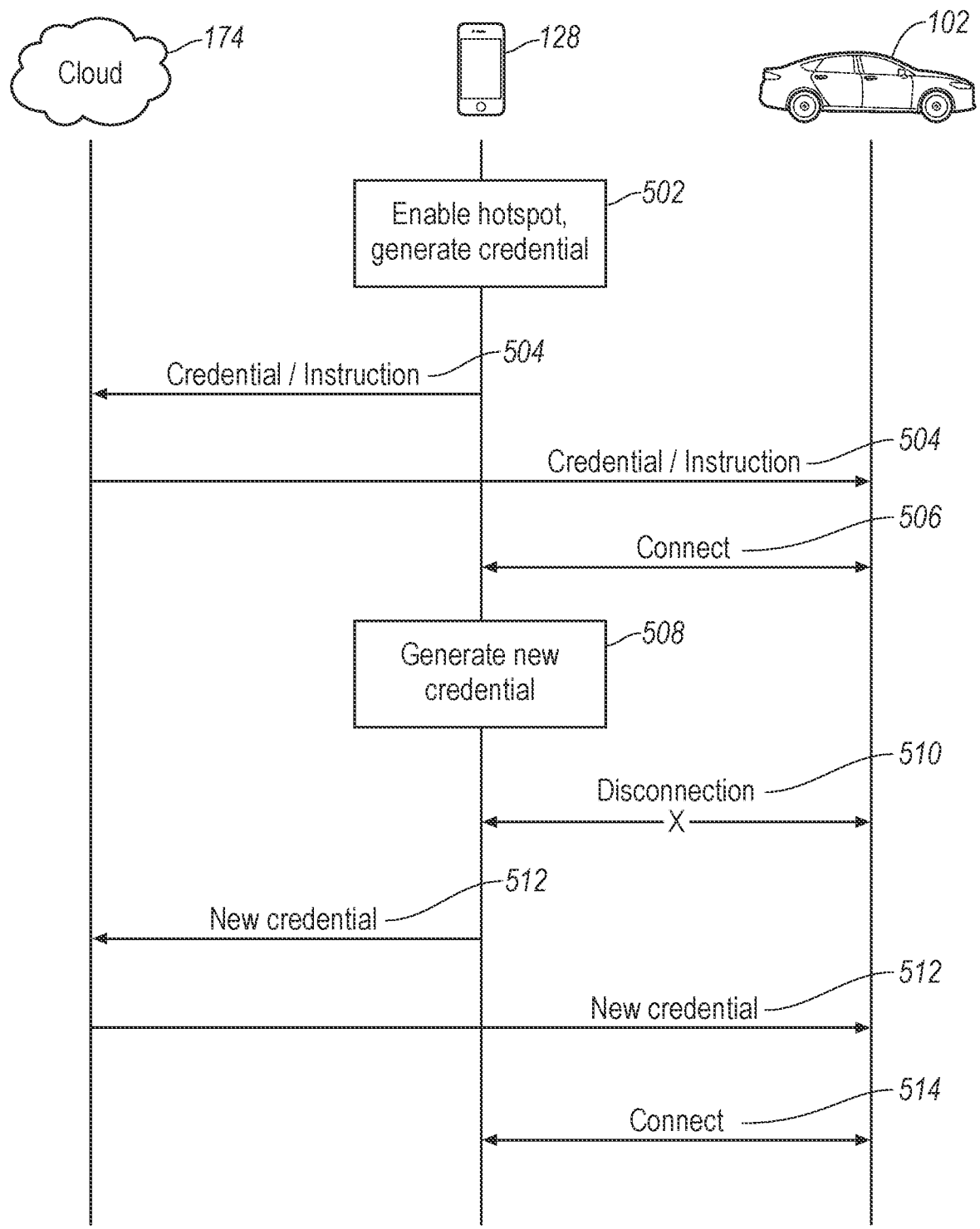
FIG. 5 illustrates an example data flow diagram of another embodiment of the present disclosure.

Referring to FIG. 5, a data flow diagram 500 for a process of anther embodiment of the present disclosure is illustrated. At operation 502, the mobile device 128 enables the wireless hotspot 302 and generates a credential 168 to connect to the hotspot 302. At operation 504, the mobile device 128 sends the credential 168 and connection instructions to the vehicle 102 via the cloud 174. Responsive to receiving the credential 168 and the instructions, at operation 506, the vehicle 102 connects to the wireless hotspot 302 of the mobile device 128 to establish a direction connection 130. The mobile device 128 may be further configured to generate new credentials to replace old ones for security reasons. The new credentials may be generated periodically (e.g. every 24 hours). Alternatively, the new credential may be generated responsive to a predefined condition being met. For instance, the mobile application 146 may be configured to use different credentials at different locations defined by geofencing. Responsive to detecting the mobile device 128 and/or the vehicle 102 enters a different predefined geofence, the mobile application 146 may be configured to regenerate a new credential for security reasons. Responsive to generating a new credential 168 at operation 508, the mobile device 128 disconnects from the vehicle 102 at operation 510 as the old credential is no long valid. Alternatively, the vehicle 102 may be configured to automatically disconnect from the wireless hotspot 302 responsive to detecting the vehicle 102 has entered a different geofence, and waits from a new credential to reconnect to the hotspot 302. At operation 512, the mobile device 128 sends the newly generated credential 168 to the vehicle 102 via the cloud 174, to allow the vehicle 102 to reconnect to the hotspot 302 at operation 514. The process may repeat as new credentials are generated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system, comprising:
a telematics control unit, configured to communicate with a mobile device over a wide area network (WAN); and
a controller, programmed to
responsive to receiving over the WAN an instruction and a credential for a local area network (LAN) originated from the mobile device, connect to the LAN as instructed using the credential and identify the mobile device connected to the LAN using the instruction, wherein the instruction identifies the LAN and the mobile device; and
establish a link with the mobile device via the LAN as identified.

2. The vehicle system of claim 1, wherein the controller is further programmed to
receive a link instruction along with the credential from via the wide area network.

3. The vehicle system of claim 1, wherein the controller is further programmed to
responsive to receiving a command from the mobile device via the link, execute the command to perform a predefined function.

4. The vehicle system of claim 1, wherein the link is a transmission control protocol/Internet protocol (TCP/IP) link enabled via Wi-Fi technology.

5. The vehicle system of claim 1, wherein the wide area network is a cellular connection.

6. The vehicle system of claim 1, wherein the controller is further programmed to
responsive to receiving a command over the wide area network, execute the command to perform a predefined function.

7. A vehicle, comprising:
a telematics control unit, configured to connect to a cellular network; and
a controller, programmed to
responsive to receiving, via the cellular network, a credential originated from a mobile device for connecting to a wireless hotspot enabled by the mobile device, connect to the wireless hotspot using the credential and establish a hotspot connection; and
responsive to receiving a command from the mobile device via the hotspot connection, execute the command to perform a predefined function,
wherein the cellular network is independent from the hotspot connection.

8. The vehicle of claim 7, wherein the controller is further programmed to
responsive to detecting the vehicle has entered a predefined geofence, disconnect from the hotspot of the mobile device.

9. The vehicle of claim 8, wherein the controller is further programmed to
responsive to receiving, via the cellular network, a new credential for connecting to the wireless hotspot of the mobile device while the vehicle is located in the predefined geofence, reconnect to the wireless hotspot using the new credential and re-establish the hotspot connection.

10. The vehicle of claim 7, wherein the controller is further programmed to
responsive to receiving a second command from cellular network, execute the second command to perform a second predefined function.

11. The vehicle of claim 7, wherein the wireless hotspot is a Wi-Fi hotspot.

12. The vehicle of claim 7, wherein the wireless connection is a cellular connection.

13. A mobile device, comprising:
a first transceiver configured to connect to a cellular network;
a second transceiver configured to enable a wireless hotspot; and
a controller, programmed to
responsive to receiving a user input, enable the wireless hotspot and generate a credential for the wireless hotspot;
send the credential to a vehicle associated with the mobile device using the first transceiver via the cellular network through a cloud server; and
responsive to detecting the vehicle connects to the wireless hotspot, transmit a vehicle command to the vehicle using the second transceiver via the hotspot.

14. The mobile device of claim 13, wherein the controller is further programmed to
responsive to detecting the mobile device has entered a predefined geofence, generate a new credential for the wireless hotspot; and
send the new wireless hotspot to the vehicle via the cellular network through the cloud server.

15. The mobile device of claim 13, wherein the wireless hotspot is a Wi-Fi hotspot.

* * * * *